March 25, 1930.  O. ERL  1,752,160

SLICING AND GRINDING MACHINE

Filed July 16, 1928  2 Sheets-Sheet 1

Inventor
Otto Erl.
By A. J. O'Brien
Attorney

March 25, 1930.  O. ERL  1,752,160
SLICING AND GRINDING MACHINE
Filed July 16, 1928   2 Sheets-Sheet 2

Inventor,
Otto Erl.
By A. J. O'Brian
Attorney

Patented Mar. 25, 1930

1,752,160

UNITED STATES PATENT OFFICE

OTTO ERL, OF DENVER, COLORADO

SLICING AND GRINDING MACHINE

Application filed July 16, 1928. Serial No. 293,257.

This invention relates to improvements in slicing machines.

It is the object of this invention to produce a machine that can be used for slicing potatoes, onions, carrots, cabbage or any other vegetable, and which will cut slices of any thickness desired and which will also cut strips such as are employed in connection with shoe-string and French fried potatoes.

In restaurants, hotels, and other places where food is prepared in large quantities, it is necessary to have a machine for slicing vegetables and for preparing salads and it is primarily for this purpose that this machine is intended.

In institutions of the type mentioned, machines known as cake machines are quite universally employed. These machines are provided with a place where a meat chopper can be attached so as to be run by the power that is used for running the cake machine. The meat chopper can be readily detached and it is my intention to attach my improved slicing machine to the same power take-off that is now used for the meat grinder.

This invention can be most readily understood and most clearly described when reference is had to the accompanying drawings in which the preferred construction has been illustrated, and in which.

Figure 4:
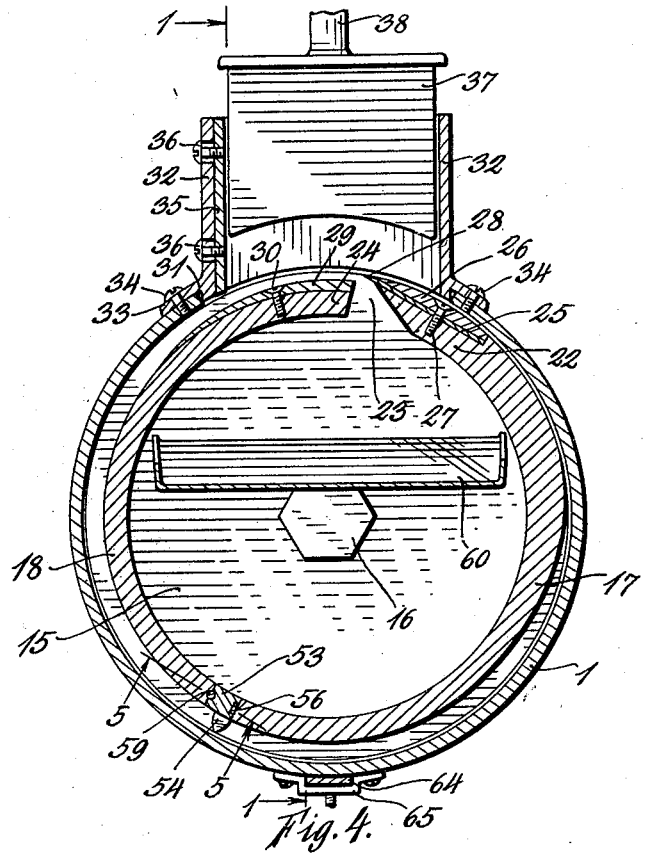
Fig. 4 is a section taken on line 4—4, Fig. 1.

In the drawing numeral 1 represents the cylinder which is open at one end and whose other end is closed by means of a transverse wall 2. A tubular hub 3 extends outwardly from the center of the end wall 2 and has its outer end 4 reduced in diameter so as to form a shoulder 5. A shaft 6 is rotably mounted in the opening in the hub 3. This shaft is provided near its outer end with a flange or collar 7 which is located in a recess in the end of the hub. The outer end of shaft 6 has a square portion 8 that is adapted to engage a square opening in the end of shaft 9 of the cake machine. The inner end of shaft 6 is threaded and has secured to it, a thin nut 10 which cooperates with the flange 7 to hold the shaft against longitudinal movement. The inner end of shaft 6 has an axial opening 11, which is threaded for the reception of the threaded bolt 12. This bolt is provided intermediate its ends with a thin radial flange 13, which abuts the end of shaft 6 and engages the nut 10 when the bolt is in place in the threaded opening 11. The outer end of bolt 12 has been indicated by reference numeral 14 and is also threaded. A rotor is secured to the threaded end 14 of bolt 12. This rotor consists of a circular disk 15 having a hexagonal inwardly extending hub 16. The hub is provided with a threaded opening for the reception of the end 14 of bolt 12, and when it is in place on the bolt will be rotated whenever the shaft 6 rotates. Secured to the outer surface of disk 15 are two substantially semi-cylindrical members 17 and 18. These members are each provided with cylindrical inner surfaces which are concentric with the disk 15 and are held in place by means of screws 19. The outer edges of members 17 and 18 have secured to them a ring 20 which is held in place by means of screws 21. When the members 17 and 18 are in place, they occupy the position shown in Figs. 1 and 4, and form with the disk 15 a rotor. Referring now more particularly to Fig. 4, it will be seen that the end 22 of member 17, which is adjacent to the transverse slot 23, is thicker than the end 24 of member 18. The outer surface formed by the two members 17 and 18 is substantially spiral. The outer surface of end 22 is flattened and has applied to it a cutter blade 25 against the outer surface of which a curved plate 26 is held by means of screws 27. The edge 28 of plate 25 is adjusted so that it lies in the cylindrical surface corresponding to the outer surface of plate 26. Since the end 24 of the member 18 is thinner than the corresponding end 22 of member 17, it is evident that the edge 28 of the cutter will be farther from the center of rotation than the outer surface of ring 18. In order to be able to adjust the gap or the distance between the cutting edge 28 and the outer surface of the end 24, a tapering curved plate 29 has been applied to the member 18 and is held in place by means of screws 30. By providing a plurality of plates 29 of different thicknesses, the distance between the outer surface of this plate and the cutting edge 28 can be regulated and in this manner the thickness of the slices can be determined. The upper portion of cylinder 1 is provided with an opening 31 and has attached to it a hopper 32. This hopper is provided with a flange 33 that extends over the sides of the opening 31 and which is provided with openings for the reception of the screw 34 by means of which the hopper is secured in position. The vertical walls of the hopper extend downwardly below the lower surface of the flange 33 and into the opening 31 in the manner shown in Fig. 4. Secured to the inner wall of the hopper 32, which faces the cutting edge 28, is a steel plate 35. This plate is held in place by means of screws 36 and its lower end is adjusted with respect to the cutting edge 28 so that the latter will come in close contact with it and it therefore serves as a shear plate which assists in holding the material during the operation of the slicer. From Fig. 3 it will be seen that the opening 23 extends diagonally across the rotor and that the cutting edge 28 also extends diagonally so as to produce a gradual shearing action, which facilitates the cutting and reduces the shock which would otherwise occur when the cutter strikes the material in the hopper.

For the purpose of forcing the material downwardly against the rotating cutter, a plunger 37 has been provided. This plunger is of a size slightly smaller than the opening in the hopper and is provided with two spaced upwardly extending arms 38 between which the handle 39 is located, and to which the handle is pivotally connected by means of a pivot 40. One end of this handle is provided with a hand grip 41 that is shaped so that it can be conveniently grasped and the other end is pivoted at 42 to the upper end of the bracket 43, whose lower end is secured to the hub 3 by means of screws 44. A guide 45 is connected with the hopper by means of screws 46 and is provided with an elongated slot 47 through which the lever or handle 39 extends. The upper end of guide 45 has been indicated by numeral 48 and is bent at right angles and terminates directly above the center of the plunger. A tension spring 49 has its upper end secured to the overhanging portion 48 and its lower end secured to the pin 50 that extends between the two vertical members 38. Spring 49 tends to lift the plunger and to remove it from the hopper. When material is to be sliced, it is placed in the hopper after which the plunger is pressed down on the material and forces the same against the rotating cutter.

Figure 5:
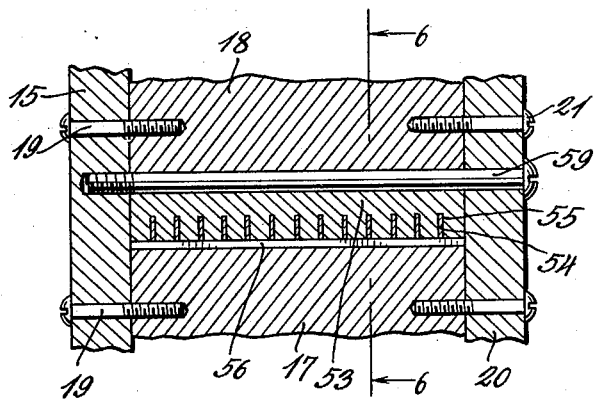
Fig. 5 is a section taken on line 5—5, Figs. 4 and 6.
Figure 6:
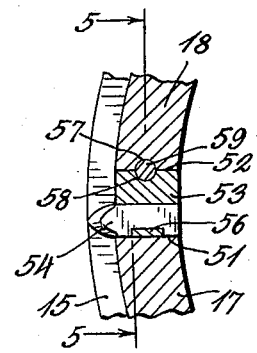
Fig. 6 is a section taken on line 6—6, Fig. 5.

The other ends of members 17 and 18 terminate at 51 and 52, respectively. The end surfaces 51 and 52 are spaced apart a short distance and receive a substantially rectangular bar 53 to which a plurality of blades 54 are connected. The bar 53 is provided on one side with a plurality of spaced transverse cuts 55 which are each adapted to receive a cutter blade 54. This side is also provided with a longitudinal groove which is adapted to receive a bar 56. The cutter blades 54 are each provided with a notch of the proper size to receive the bar 56, and therefore, when this bar is in place, it holds the blades 54 against longitudinal movement. The end surface 52 is provided with a semi-circular groove 57 and the corresponding surface of the bar 53 is provided with a complementary semi-circular groove 58. Grooves 57 and 58 are so located that when the bar 53 is in the position shown in Fig. 6, they form a circular opening which is adapted to receive the screw 59. This screw has a threaded engagement with the disk 15 in the manner shown in Fig. 5 and when the bar 53 is to be removed the screw 59 is first removed after which the bar can be shoved inwardly in a manner quite obvious. The cutters 54 are spaced about an eighth of an inch apart and by omitting every other cutter the distance between the cuts will be increased to a quarter of an inch. When the cutters 54 are in place, it is evident that they will make a plurality of parallel radial cuts in the material and when the blade 25 cuts a slice from the inner surface of the material, the slice having already been severed by parallel cuts will form strips of substantially rectangular cross section, such as are used for French fried or shoestring potatoes. It is also obvious that the blades 54 can be employed to great advantage in the making of vegetable salads and for many other purposes. If slices only are desired, such as are used for potato chips, the blades 54 can all be removed from the bar 53, or a similar bar substituted which carries no cutter blades. In order to direct the sliced material into a receptacle, a chute 60 has been provided. This chute is secured by means of rivets 61 to the upper inclined end 62 of a bracket. This bracket has a vertical portion 63 that terminates in a horizontal part 64. The cylinder 1 is provided on its lower surface with two loops 65, which are so constructed that the end 64 may be passed between these loops and the outer surface of the cylinder. A set screw 66 serves to hold the bracket in place. From Fig. 1 it will be seen that the upper end of chute 60 is located above the hexagonal hub 16 and comes in close contact with the outer surface of disk 15. The material that is sliced will therefore fall directly into this chute and will be conveyed by it to the proper receptacle.

Figures 1, 2, 3:
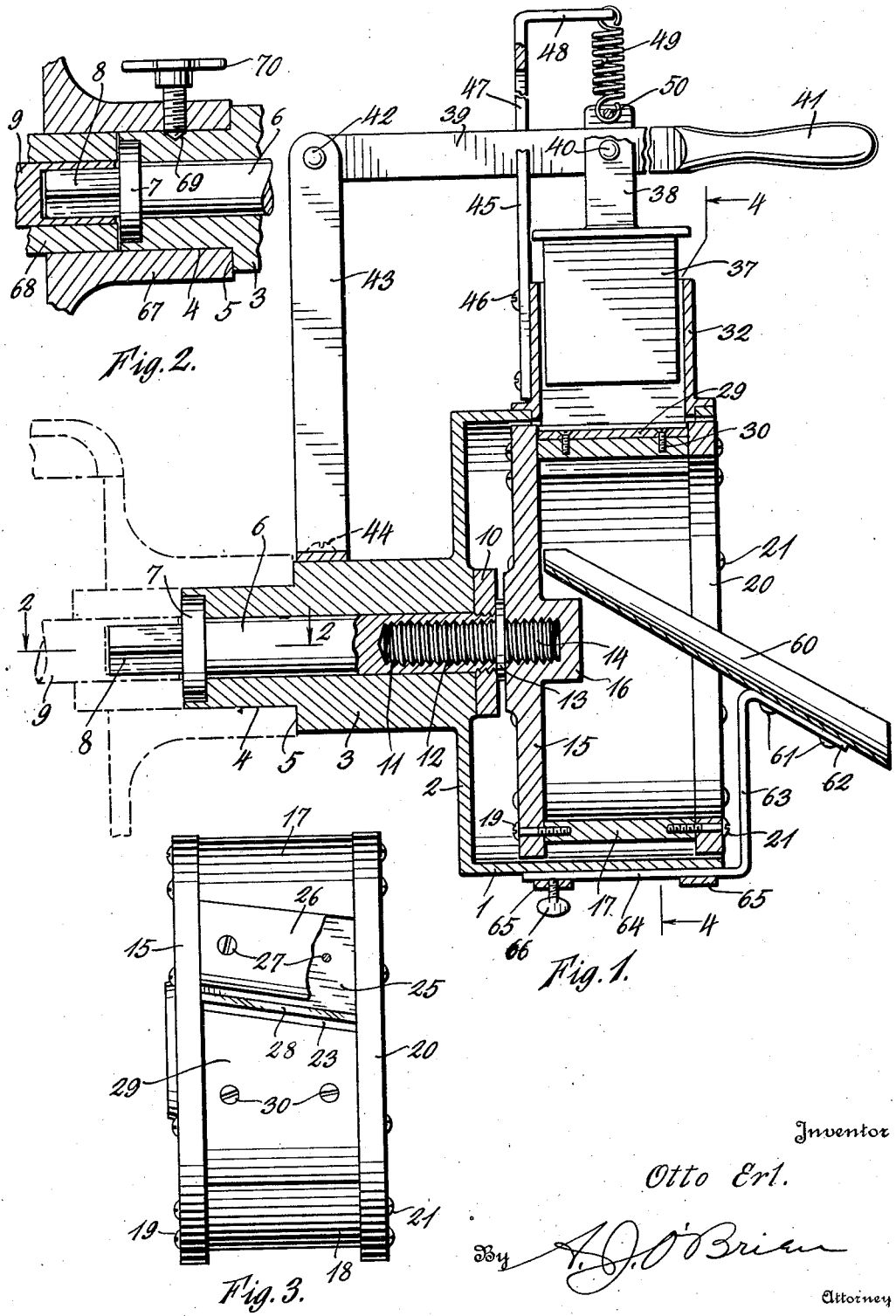
Fig. 1 is a vertical section taken on line 1—1, Fig. 4, and shows the machine attached to the cake machine, portions of which have been indicated by dot and dash lines.
Fig. 2 is a detailed view taken on line 2—2, Fig. 1, and shows more clearly the manner in which this improved slicing machine is attached to the power take-off of the cake machine.
Fig. 3 is a side elevation of the rotor or splicer with parts thereof broken away to better disclose the construction.

I have already called attention to the fact that this slicing machine is intended to be used in connection with a well known type of cake machine. In Fig. 2 I have shown the manner in which this machine is attached to the cake machine. The latter machine is provided with a cylindrical projection 67 within which is a bearing 68. The shaft 9 rotates in this bearing and is provided with a rectangular axial opening adapted to receive the end 8 of shaft 6. The reduced hub portion 4 fits inside of the cylindrical projection 67 and is provided with a depression 69 with which the inner end of the set screw 70 engages. When the parts are assembled in the manner shown in Fig. 2, shaft 6 will be rotated whenever shaft 9 rotates.

I want to call attention to the fact that the rotor can very easily be removed for the purpose of cleaning. When the rotor is to be removed, the chute 60 is first removed, after which a socket wrench is applied to the hexagonal hub 16, and by this means the rotor is unscrewed from the threaded end 14. It can now be cleaned and the cutting blade 25 and curved plate 29 can be conveniently replaced by others when in this position.

Having described the invention what is claimed as new is:

1. In a machine of the class described, a cylinder having one end closed and the other open, a hollow rotor located within the cylinder and mounted for rotation about the axis of the cylinder, the wall of the rotor having an elongated opening extending parallel with the axis of rotation, one side of the opening having a groove adapted to receive a screw, a cutter blade holder located in the opening, said holder having one side provided with a groove that supplements the groove in the side of the opening for the purpose of enclosing the screw, the other side of the holder having a plurality of transverse spaced cuts adapted to receive cutter blades, cutter blades in the cuts and means for preventing the blades from moving longitudinally in the cuts.

2. In a machine of the class described, a cylinder having one end closed and the other open, a hollow rotor located within the cylinder and mounted for rotation about the axis of the cylinder, the wall of the rotor having an elongated opening extending parallel with the axis of rotation, one side of the opening having a groove adapted to receive a screw, a cutter blade holder located in the opening, said holder having one side provided with a groove that supplements the groove in the side of the opening for the purpose of enclosing the screw, the other side of the holder having a longitudinal groove, a removable plate located in the groove, said holder having also a plurality of spaced transverse cuts adapted to receive cutter blades and cutter blades in the transverse cuts, said blades being provided along one edge with a notch adapted to receive the removable plate.

3. In a slicing machine having a cylinder closed at one end and open at the other, a tubular hub extending outwardly from the closed end, and a shaft rotatably mounted in the hub, a rotor connected with the shaft so as to be rotated thereby, said rotor being formed from two substantially semi-cylindrical members secured to one side of the end plate so as to be concentric therewith, the opposite ends of said members being separated a short distance from each other so as to form two elongated openings, the outer surface of one of the members adjacent one of the openings being spaced farther from the center than the opposing end of the other member, a cutter blade secured to the surface farthest from the center, a ring secured to the other edges of the semi-cylindrical members, a cutter blade holder secured in the other opening, said holder having a plurality of spaced transverse cuts adapted to contain cutter blades in the cuts, means for securing the cutter blades to the holder and means for securing the holder in place in the opening.

In testimony whereof I affix my signature.
.OTTO ERL.